G. P. GREGORY AND H. MacKELVIE.
GAGE.
APPLICATION FILED APR. 16, 1918.
1,389,246.
Patented Aug. 30, 1921.
2 SHEETS—SHEET 2.
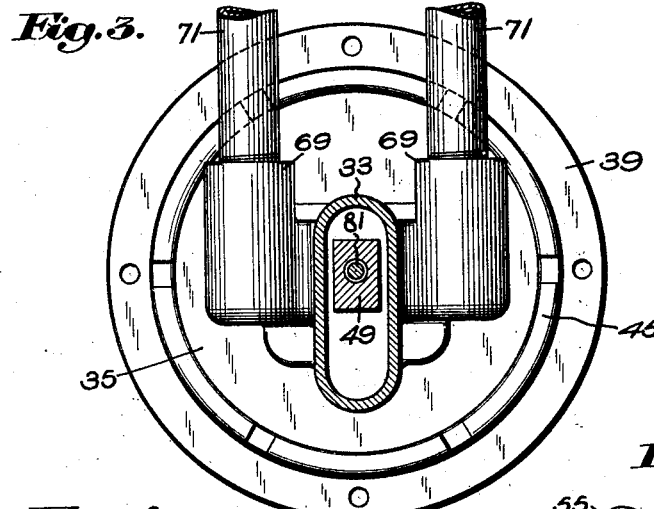
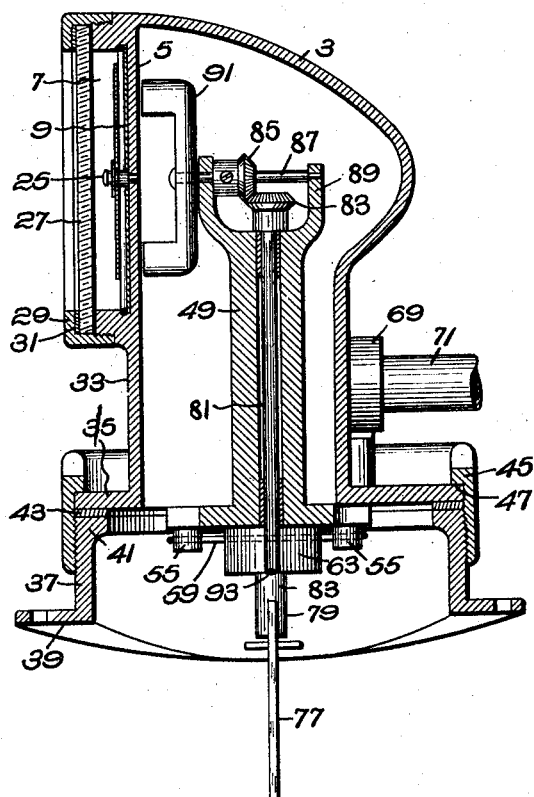
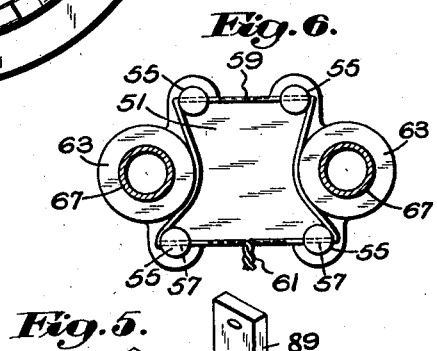
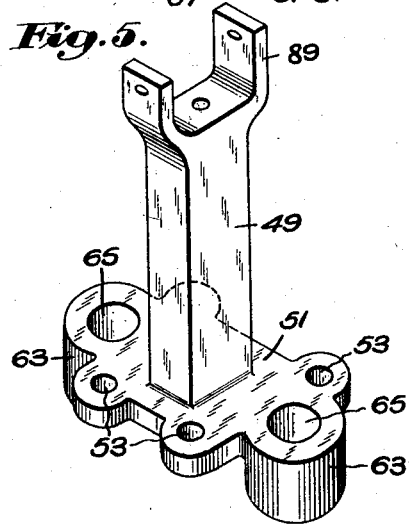
Inventors:
George P. Gregory
Hugh MacKelvie
By Robt P. Hains
Attorney.

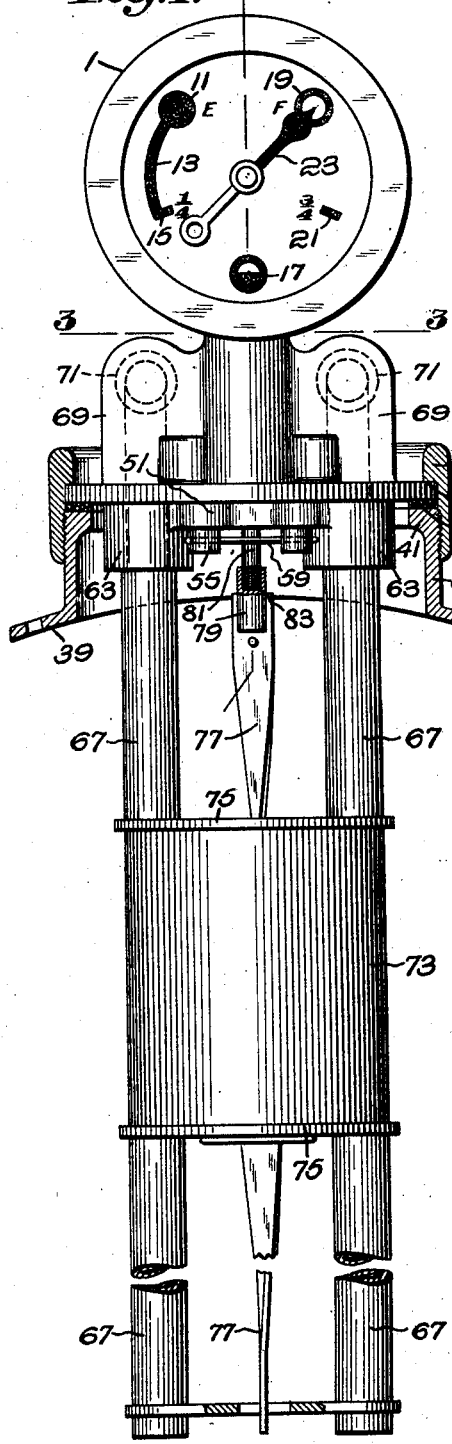
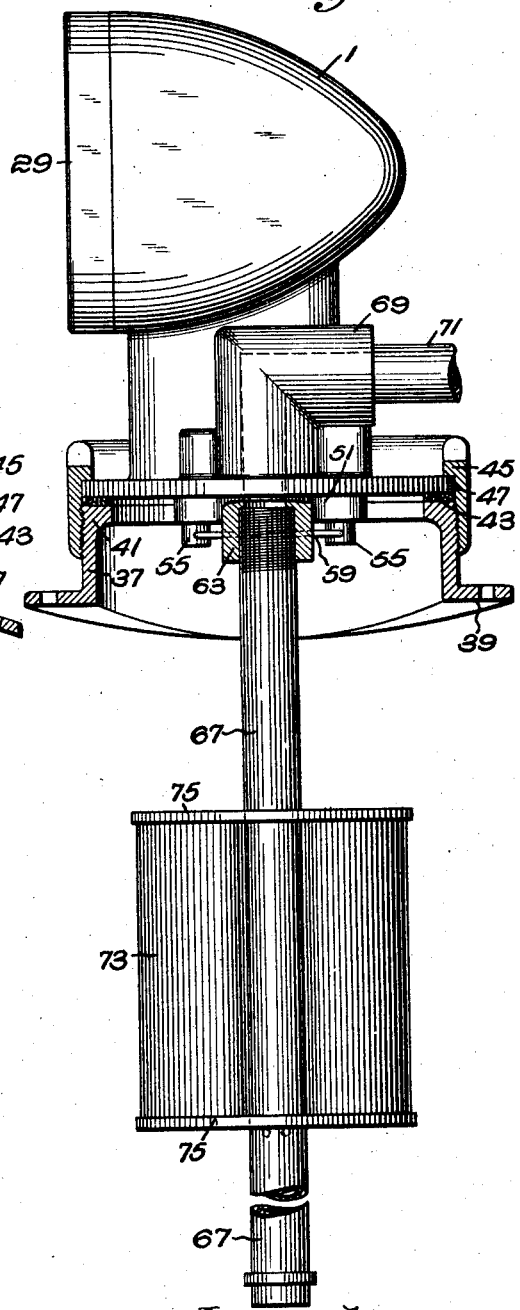

UNITED STATES PATENT OFFICE.

GEORGE P. GREGORY AND HUGH MacKELVIE, OF BOSTON, MASSACHUSETTS, ASSIGNORS TO BOSTON AUTO GAGE COMPANY, OF BOSTON, MASSACHUSETTS, A CORPORATION OF MASSACHUSETTS.

GAGE.

1,389,246.  Specification of Letters Patent.  Patented Aug. 30, 1921.

Application filed April 16, 1918. Serial No. 228,829.

*To all whom it may concern:*

Be it known that we, GEORGE P. GREGORY, a citizen of the United States, and HUGH MacKELVIE, a subject of King George V of Great Britain, residing at Boston, county of Suffolk, and State of Massachusetts, have invented an Improvement in Gages, of which the following description, in connection with the accompanying drawings, is a specification, like characters on the drawings representing like parts.

The invention to be hereinafter described relates to gages for measuring the depth of liquids, and more particularly, though not exclusively, to gages for measuring the fuel depth in a tank for supplying fuel to the engine of an aeroplane.

A gage for this purpose should be light but strong in construction to enable its continued reliable operation under the rack and vibration which such a gage must necessarily experience. One of the objects of the present invention is to provide a light, strong, reliable gage for this purpose.

Aeroplane gages are usually mounted in front of the driver of the aeroplane, where they are exposed to strong air pressure. Another object of the invention is to provide a gage having a casing which is formed to reduce the head resistance of the air thereon to a minimum, and to provide means for securely connecting the casing with the fuel tank, so that there will be no danger of the casing being dislocated or torn from the tank.

It is important that the driver of the aeroplane should be able by a quick glance to read the gage and determine the amount of fuel remaining in the tank. Another object of the invention is to provide a gage which may be quickly and easily read without detracting the driver's attention unduly from the control of the aeroplane, and which will furnish the driver sufficient warning when his supply of fuel is getting dangerously low.

It is important that the gage should be thoroughly inspected before making a flight to insure that its parts are in proper working order to reliably indicate to the driver at all times the amount of gasolene in the tank. Still another object of the invention is to provide a gage, the parts of which may be readily separated and reassembled to allow quick inspection, adjustment and repair thereof.

With the aforesaid and other objects in view, the character of the invention will be best understood by reference to the following description of one good form thereof shown in the accompanying drawings, wherein:—

Figure 1 is a view partly in front elevation and partly in section of the gage shown herein as embodying the invention;

Fig. 2 is a view partly in side elevation and partly in section of the gage shown in Fig.1;

Fig. 3 is a horizontal section taken on line 3—3 of Fig. 1;

Fig. 4 is a vertical section taken on line 4—4 of Fig. 1;

Fig. 5 is a perspective view of the post for supporting part of the means for transmitting movement from the float to the index; and Fig. 6 is a detail view showing the means for locking the screws for connecting the post base with the neck base.

Referring to the drawings, the gage shown therein as one embodiment of the invention comprises a casing 1 having a body 3 of tapered or cone-like form to reduce head resistance of air thereon. A wall 5 which may be integral with the casing separates the body from a recess 7 at the front of the casing containing a plate 9 which may be seated against the wall 5 and have a suitable dial thereon. The dial may be marked with suitable devices formed to characterize the level of the liquid.

In the present instance, this dial comprises a large fully blackened spot 11 (Fig. 1) for indicating that the fuel tank is empty. Suitable means may be provided to furnish a readily visualized indication that the level of the fuel is becoming dangerously low in the tank. In the present instance, this means is in the form of a heavy arc-shaped mark 13 projecting from the spot 11 and terminating at its lower end in a heavy graduation 15. The word "Danger" may be marked on the dial along the arc-shaped mark 13. The dial may be marked with a large circle 17 having a semi-circular segment blackened, which will serve as a ready indication that the tank is one-half full. The dial may be marked with a heavy circle 19 to furnish ready indication that the tank is full. The spot 11 may have the letter "E" adjacent the same to indicate the tank is empty, the circle 19 may have the letter "F" adjacent the same to indicate the tank is full, the graduation 15 may have "¼" opposite the same to indicate the tank is ¼ full, and a graduation 21 midway between the partially darkened circle 17 and the circle 19 to indicate the tank is ¾ full.

In aeroplanes for war use, it is objectionable to carry any lights which will indicate the presence of the aeroplane to the enemy. To enable a ready visualization of the dial without the use of lights, the marks on the dial may be rendered luminous by radium. The construction of the dial is such that the driver by a quick glance at the dial may at once learn whether the tank is full, partially full or empty, and he will have a readily visualized indication and warning that the fuel is getting dangerously low.

Coöperating with the dial described is an index 23 pivotally mounted on a pin 25 projecting from the dial plate 9. The pointer end of the index may be rendered luminous by radium to facilitate ready visualization thereof in the dark.

To protect the dial and index, a heavy glass 27 is seated on the front end of the casing and secured thereto by a bezel 29 threaded to said casing, a suitable packing ring 31 being confined between said glass and bezel.

The casing may have a hollow neck 33 projecting downward therefrom and provided at its lower end with a flange or base 35 conveniently of circular form. In the present instance, the body 3, wall 5, neck 33 and base or flange 35 are formed of one integral casting of aluminum or other suitable metal.

Suitable means may be provided for securing the base or flange to the fuel tank. To accomplish this, in the present instance, a collar 37 is provided conveniently of circular form conforming to the size of the flange or base 35. This collar may have an outwardly projecting flange 39 for connection with the fuel tank, and in the present instance, said flange is curved to conform to the contour of the curved wall of the tank. The collar may have an internal flange 41 on which the base of the neck may rest, a suitable packing ring 43 being interposed between them. Means may be provided for detachably connecting the base of the neck with the collar. For this purpose a clamping ring 45 may be provided threaded to the outer surface of the collar 37 and having a shoulder 47 for engagement with the upper surface of the base of the neck.

A support conveniently in the form of a hollow post 49 may project upward through the neck into the body of the casing. Suitable means may be provided to detachably connect this post with the base of the neck. This means may be in the form of a base or flange 51 (Fig. 5) having four holes 53 therein for receiving suitable screws 55 adapted to be screwed into the base of the neck. To lock the screws against loosening, they may have bores 57 extending transversely through the heads thereof adapted to receive a wire 59, the ends of which may be twisted together as indicated at 61. The construction is such that the wire will serve to securely lock the screws against rotation, but may be readily removed to allow removal of the screws to detach the base of the post from the base of the neck when desired.

The base of the flange may be formed to present bosses 63 having ports 65 therein which may be tapped to receive a pair of tubes 67 projecting downward toward the bottom of the tank. A pair of elbows 69 may project upward from the base of the neck at opposite sides thereof, and preferably are formed integral with said base. These elbows may be connected to pipes 71, one of which may lead to a pump or other source of compressed fluid, and the other may lead to the engine. The elbows 69 may register with the ports 65 in the base of the post and communicate therethrough with the tubes 67. The construction is such that one of the pipes, elbows and tubes may receive fluid pressure to force fuel from the tank through the other tube, elbow and pipe. It will be noted that since the tubes are connected to the base of the post and are not connected to the elbows, the tubes will be separated from and connected to the base of the neck incidentally to the separation of the base of the post from the base of the neck, and the connection thereof thereto, without requiring attention of the mechanic to the connections for the tubes.

A float 73 of metal or other suitable material may have plates 75 at the upper and lower ends thereof adapted to slide along and be guided by the tubes 67. A twisted ribbon 77 may be mounted between the tubes 67 and extend through elongated slots in the upper and lower plates 75 of the float, the construction being such that as the float rises and falls, it will impart rotative movement to said twisted ribbon.

Suitable means may be provided to impart rotative movement from the twisted ribbon to the index. To accomplish this, in the present instance, the upper end of the twisted ribbon may be provided with a union 79 attached thereto and having a socket tapped to receive the lower end of a shaft 81 projecting upward through the hollow post 49. A bevel gear 83 may be mounted fast on the upper end of said shaft and may mesh with a bevel gear 85 fast on a cross shaft 87 journaled in bearings in a fork 89 formed on the upper end of the post. One end of this shaft may project beyond said fork toward the wall 5 and dial plate 9, and have a magnet 91 fast thereon. The construction is such that as the float moves along the twisted ribbon, it will rotate the latter and the shaft 81, which in turn will rotate the gears 83 and 85 and the magnet 91. The latter will move the index 23 over the dial to indicate the level of the fuel in the tank.

It is important that the index should point to the spot 11 when the float is in its lowered position and the tank is empty. To accomplish this, the shaft 81 may be adjusted in its socket 79 to bring the index to the correct position, and then the shaft may be secured by a drop of solder 93 at the juncture of the upper end of the socket with the shaft.

When it is desired to inspect the parts of the gage, the clamping ring 45 may be unscrewed from the collar, thereby allowing the casing, the tubes 67, the float 73 and the post 49 to be removed from the tank through the collar. Then the screws 55 connecting the post base to the neck base will be conveniently accessible and may be removed to allow the post, magnet 91 and the transmission means carried by the post to be readily withdrawn from the casing for the purpose of inspection, adjustment or repair thereof. It will be noted that the neck of the casing is elongated in cross section, the size of the neck being such that the magnet must be rotated to a predetermined position to allow the same to pass through the neck. This may be readily accomplished by giving the shaft 81 the proper amount of rotation.

After the parts of the gage have been inspected, they may be readily reassembled. To accomplish this, it is merely necessary to insert the post with the parts carried thereby up through the neck into the casing, secure the screws 55 to the base of the neck, and screw the clamping collar 45 onto the collar.

It will be understood that the invention is not limited to the specific embodiment shown, but that various deviations may be made therefrom, without departing from the spirit and scope of the appended claims.

What is claimed is:—

1. A gage for measuring the depth of liquids, comprising, in combination, a casing having a hollow neck projecting downward therefrom, a base for said neck, a collar for connection with a tank, means for securing said neck base to said collar, a post separate from but connected to said base and projecting up through said neck into said casing, a dial for said casing, an index movable over said dial, a float, means controlled by said float and including a shaft projecting through said post, and gearing carried by the latter for imparting movement from said shaft to said index, and means detachably connecting said post to the base of said neck, the latter being sufficiently large to allow said post and gearing to pass therethrough.

2. A gage for measuring the depth of liquids, comprising, in combination, a casing having a hollow neck projecting downward therefrom, a base for said neck, a collar for connection with a tank, a clamping ring for securing the base of said neck to said collar, a support carried by and projecting from said base through said neck upward into said casing, a dial for said casing, an index movable over said dial, a float, and means including transmission means carried by said support for imparting movement from said float to said index.

3. A gage for measuring the depth of liquids, comprising, in combination, a casing having a front face and a body projecting rearward therefrom, a diaphragm integral with said casing adjacent said front face, a dial at the front side of said diaphragm, an index movable over said dial, a neck projecting downward from said body, a base for said neck, means to connect said base with a tank, a support projecting upward through said neck into said casing, a float, and means including a magnet and transmission means carried by said support for imparting movement from said float to said index.

4. A gage for measuring the depth of liquids, comprising, in combination, a casing having a hollow neck projecting downward therefrom, a collar for connection with a tank, means to detachably connect said neck with said collar, a dial for said casing, an index movable over said dial, a float, and means to impart movement from said float to said index including a magnet and transmission means in said casing, and a post projecting upward through said neck into said casing carrying said magnet and transmission means, said neck being sufficiently large to allow said magnet, transmission means, and post to pass therethrough on detachment of said neck from said collar.

5. A gage for measuring the depth of liquids, comprising, in combination, a casing having a hollow neck projecting downward therefrom, a collar for connection with a tank, a dial for said casing, an index movable over said dial, a float, and means to impart movement from said float to said index including transmission means mounted in said casing, a post projecting upward through said neck to support said transmission means, a base for said post, means detachably to connect said base with said neck, and a pair of tubes connected to said base for guiding said float, one of said tubes being adapted to receive fluid pressure to force liquid through the other tube from the tank.

6. A gage for measuring the depth of liquids, comprising, in combination, a casing having a hollow neck projecting downward therefrom, a base for said neck, a collar for connection with a tank, a pair of pipe fittings projecting outward from said base, a post projecting upward through said neck into said casing, a base for said post having ports communicating with said pipe fittings, a pair of tubes connected to said post base and communicating with said ports, means detachably to connect said post base with said neck base, a dial for said casing, an index movable over said dial, a float, and means to impart movement from said float to said index including transmission means carried by said post.

7. A gage for measuring the depth of liquids, comprising, in combination, a casing having a hollow neck projecting downward therefrom, a base for said neck, a collar for connection with a tank, means to connect said base with said collar, a pair of pipe elbows projecting outward from said base, a post projecting upward through said neck into said casing, a base for said post, a pair of tubes connected to said base and communicating with said pipe elbows, one of said tubes being adapted to receive fluid pressure to force liquid from the tank through the other tube, a float guided by said tubes, a dial for said casing, an index movable over said dial, and means to impart movement from said float to said index including transmission means carried by said post.

8. A gage for measuring the depth of liquids, comprising, in combination, a casing having a hollow neck projecting downward therefrom, elongated in transverse section, a flange projecting from said neck, a collar for connection with a tank, means to connect said flange with said collar, a pair of pipe fittings projecting from said flange adjacent opposite sides of said neck, a support projecting upward through said neck into said casing, a flange on said support, means to connect said support flange with said neck flange, a pair of tubes connected to said support flange, one of said tubes being adapted to receive fluid pressure to force liquid through the other tube from the tank, a float guided by said tubes, a dial for said casing, an index movable over said dial, a float guided by said tubes, and means to impart movement from said float to said index including transmission means carried by said support.

9. A gage for measuring the depth of liquids, comprising, in combination, a casing having a body and a recess, a wall integral with said casing separating said body from said recess, a dial in said recess, an index in said recess movable over said dial, a glass secured to said casing in front of said index and dial, a hollow neck projecting downward from said casing, a base for said neck, a collar for connection with a tank, means to detachably connect said base with said collar, a support separate from said neck and projecting upward therethrough into the body of said casing, a flange for said support, means to detachably connect said flange with the base of said neck, a float, and means to impart movement from said float to said index including transmission means carried by said support.

10. A gage for measuring the depth of liquids, comprising, in combination, a casing having a hollow neck projecting downward therefrom, a collar for connection with a tank, means to connect said neck with said collar, a dial for said casing, an index movable over said dial, a support projecting upward through said neck into said casing, a float, and means to impart movement from said float to said index including a magnet, a shaft projecting through said support, a twisted ribbon, and means for connecting said ribbon with said shaft having provision for rotative adjustment of said shaft relatively to said ribbon that the index may indicate the tank is empty when the float is in its lowest position.

In testimony whereof, we have signed our names to this specification.

GEORGE P. GREGORY.
HUGH MacKELVIE.